US007964229B2

(12) United States Patent
Lee et al.

(10) Patent No.: US 7,964,229 B2
(45) Date of Patent: Jun. 21, 2011

(54) FILMS COMPRISING A LIQUID-ABSORBANT INNER LAYER AND AN IMPERMEABLE OUTER LAYER

(75) Inventors: I-Hwa Lee, Wilmington, DE (US); James Michael McKenna, Hockessin, DE (US); Raghuram Narumanchi, Highland Park, IL (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 133 days.

(21) Appl. No.: 12/564,155

(22) Filed: Sep. 22, 2009

(65) Prior Publication Data

US 2010/0009045 A1 Jan. 14, 2010

Related U.S. Application Data

(62) Division of application No. 10/704,934, filed on Nov. 11, 2003, now Pat. No. 7,615,270.

(60) Provisional application No. 60/425,604, filed on Nov. 12, 2002.

(51) Int. Cl.
*B65B 25/06* (2006.01)
*C12C 3/04* (2006.01)

(52) U.S. Cl. ......... 426/412; 426/415; 426/420; 426/465

(58) Field of Classification Search .................. 426/412, 426/415, 420, 465

See application file for complete search history.

(56) References Cited

U.S. PATENT DOCUMENTS

| | | | |
|---|---|---|---|
| 2,241,322 | A | 5/1941 | Hanford |
| 2,312,966 | A | 3/1943 | Hanford |
| 2,512,606 | A | 6/1950 | Bolton et al. |
| 3,278,663 | A | 10/1966 | Graham |
| 3,337,665 | A | 8/1967 | Underwood et al. |
| 3,393,210 | A | 7/1968 | Speck |
| 3,456,044 | A | 7/1969 | Pahlke |
| 3,645,992 | A | 2/1972 | Elston |
| 4,076,698 | A | 2/1978 | Anderson et al. |
| 4,174,358 | A | 11/1979 | Epstein |
| 4,205,158 | A | 5/1980 | Hoeschele |
| 4,590,106 | A | 5/1986 | Hsu et al. |
| 4,659,599 | A | 4/1987 | Strutzel |
| 4,725,481 | A | 2/1988 | Ostapchenko |
| 4,760,116 | A | 7/1988 | Roberts |
| 4,769,421 | A | 9/1988 | Hwo |
| 4,797,235 | A | 1/1989 | Garland et al. |
| 4,886,634 | A | 12/1989 | Strutzel et al. |
| 4,944,970 | A | 7/1990 | Stenger et al. |
| 5,028,674 | A | 7/1991 | Hatch et al. |
| 5,198,401 | A | 3/1993 | Turner et al. |
| 5,382,391 | A | 1/1995 | Juhl et al. |
| 5,405,922 | A | 4/1995 | DeChellis et al. |
| 5,408,000 | A | 4/1995 | Katsaros et al. |
| 6,200,613 | B1 | 3/2001 | Schafer et al. |
| 6,660,315 | B2 | 12/2003 | Miller et al. |
| 6,682,792 | B2 | 1/2004 | Schmal et al. |
| 7,022,357 | B2 | 4/2006 | Krallmann et al. |
| 2003/0055181 | A1 | 3/2003 | Schenck et al. |
| 2003/0152725 | A1 | 8/2003 | Delius |
| 2006/0188615 | A1 | 8/2006 | Wilfer et al. |

FOREIGN PATENT DOCUMENTS

| | | | |
|---|---|---|---|
| DE | 196 45 276 | A1 | 5/1998 |
| EP | 0 113 136 | A1 | 7/1984 |
| EP | 0 155 541 | A2 | 9/1985 |
| EP | 0 176 980 | A2 | 4/1986 |
| EP | 0 325 151 | A2 | 7/1989 |
| EP | 0 992 194 | A1 | 4/2000 |
| JP | 04-135751 | | 5/1992 |
| JP | 2000-108256 | | 4/2000 |
| JP | 2002-187246 | | 7/2002 |
| WO | WO97/36798 | A1 | 10/1997 |
| WO | WO02/054878 | A1 | 7/2002 |
| WO | WO02/082913 | A1 | 10/2002 |
| WO | WO02/085619 | A1 | 10/2002 |

*Primary Examiner* — Michael C Miggins

(57) ABSTRACT

Films comprising a liquid-absorbant layer and an impermeable layer are provided. Processes for manufacturing these films is also provided. The films are suitable for preparation of tubular casings and shrinkbags, in particular, casings for smoked foodstuffs. Also described are foodstuffs processed in the tubular casings.

19 Claims, No Drawings

FILMS COMPRISING A LIQUID-ABSORBANT INNER LAYER AND AN IMPERMEABLE OUTER LAYER

This application is a division of U.S. patent application Ser. No. 10/704,934, filed Nov. 11, 2003, now U.S. Pat. No. 7,615,270, which claims priority from U.S. Provisional Application No. 60/425,604, filed Nov. 12, 2002, now expired, the entire contents being incorporated herein by reference.

FIELD OF THE INVENTION

This invention relates to a laminate film useful in packaging and/or for encasing foodstuffs. In particular, this invention is a film that is useful for making casings and shrinkbags that can be used to incorporate additives into foodstuffs.

BACKGROUND DISCUSSION AND RELATED ART

Generally, foodstuff casings are made either of natural material such as cellulose or animal guts, or of synthetic material. Usually, the foodstuff is packed into the casing. When smoked products are desired, the encased foodstuff can be further subjected to a smoking process. In a conventional smoking process, the product is suspended in a chamber wherein it is exposed to hot smoke from burning wood. This process has the disadvantage that only natural casings can be used in this process, that is, those obtained from guts, for example, or cellulose or collagen casings which all show a natural permeability to smoke.

A critical point in the preparation and storage of smoked products is that the casings must show different permeabilities depending on the step of the process. A high permeability is needed at high temperatures (typically between 50 and 100° C.) and high humidity, during the smoking process. Typically, the highly permeable cellulose casings and fibrous casings (which are cellulose casings reinforced with wood fibers) have moisture vapor transmission rates in excess of 1000 g·25 micron/$m^2$·24 hrs. Once the product is smoked and cooled, it is preferable that the casing acts as a barrier against humidity so the permeability should preferably be low, that is at rates below 1000 g·25 micron/$m^2$·24 hrs, at temperatures less than 50° C., particularly less than 30° C. Depending on the specific application, the desired permeability at temperatures less than 30° C. could be substantially below 1000 g·25 micron/$m^2$·24 hrs.

Casings made from natural products and/or cellulose can present many disadvantages: they can be expensive; their great permeability to steam can cause significant weight loss from a foodstuff; the product can be unstable due to drying and/or superficial fat oxidation. Also, graying caused by microbial spoiling of the natural casing often appears on casings. The manufacturing process for fibrous and cellulose casings involves emissions of carbon disulfide and hydrogen sulfide to the atmosphere, which can be an environmental concern, or require expensive gas scrubbing systems to minimize emissions.

There have been different approaches which attempt to overcome these problems. Single and multilayer plastic casings for packaging sausages are known in the art, for example. Recently, developments have been described in PCT Patent Application Publication WO 02/054878 to make polyamide-based casings more smokeable by blending in absorptive polymers.

Traditional smoking processes also can be inefficient in the absorption of the smoke flavorants and coloring relative to the amount of smoke produced in the smoking chamber. To try to overcome the disadvantages of the traditional smoking processes, smoke can be passed through water to prepare a concentrated solution of flavorants and colorants absorbed from the smoke, and such a solution can be used as a food processing material. This "liquid smoke" can be applied to the foodstuff during the curing process to flavor and color the foodstuff. Typically liquid smoke is applied to the surface of the food product by showering, atomizing or spraying. However, unless the liquid smoke is maintained in good contact with the surface of the foodstuff during the cooking process, use of liquid smoke is still relatively inefficient—more liquid smoke is lost than is applied. In addition, liquid smokes tend to be corrosive, and if not applied properly, cause inconsistent color and flavor.

A commercial practice for using liquid smoke involves laminating a special paper product onto a cast multilayer film of polyethylene and polyamide, and then converting the film into a tubular casing with a special sealing strip at the seam. Liquid smoke is then applied to the paper layer for transfer to the foodstuff during the cooking process.

U.S. Pat. No. 5,382,391 describes a thermoplastic film containing a modifier, such as liquid smoke, which can be transferred to the outer surface of meat during cooking. The inner layer of the thermoplastic film is a nonabsorbent polyolefin polymer such as an ethylene vinyl acetate copolymer or polyethylene in which is blended with 15 to 40 wt % polyethylene oxide.

U.S. Pat. No. 5,382,391 describes an edible collagen food wrapping containing liquid smoke encapsulated within an ingestible lipid or other oil-soluble fatty acids or waxes, where the liquid smoke is released during curing or cooking, and prior to consumption of the collagen-enclosed food product.

However, none of the conventional processes are trouble-free. It can be desirable to have a synthetic casing that can be used effectively and efficiently for storage and for a smoking process utilizing liquid smoke.

SUMMARY OF THE INVENTION

In one aspect, the present invention is a laminate film comprising (i) a liquid absorptive inner layer useful for imparting flavor and color evenly to meat during cooking, and (ii) an outer impermeable barrier layer wherein:

(A) the inner layer comprises a polymer selected from: block copolyether ester polymers or block copolyether amide polymers; and (B) the outer impermeable film layer is a single film layer, or a laminate or multilayer film comprising: (a) at least one polymer layer comprising a polymer selected from polymers in the group consisting of: polyamides or mixtures thereof, ethylene vinyl alcohol copolymers; polyvinylidene chloride; polyolefins; or mixtures of any of these; and (b) optionally at least one tie layer.

In another aspect, the present invention is a tubular casing or bag comprising a laminate film comprising (i) a liquid absorptive inner layer useful for imparting flavor and color evenly to meat during cooking, and (ii) an outer impermeable barrier layer wherein:

(A) the inner layer comprises a polymer selected from: block copolyether ester polymers or block copolyether amide polymers; and (B) the outer impermeable film layer is a single film layer, or a laminate or multilayer film comprising: (a) at least one polymer layer comprising a polymer selected from polymers in the group consisting of: polyamides or mixtures thereof, ethylene vinyl alcohol copolymers; polyvinylidene chloride; polyolefins; or mixtures of any of these; and (b) optionally at least one tie layer.

In another aspect, the present invention is a process for making a laminate film of the present invention comprising the step: coextruding the impermeable layer and the absorptive layer into a tubular laminate film in one step.

In still another aspect, the present invention is a process for manufacturing a film of the present invention by (1) a blowing process or (2) a cast coextrusion process or (3) a coextrusion coating process.

In another aspect, the present invention is a foodstuff prepared using a film of the present invention.

In still another aspect, the present invention is a process for manufacturing an oriented film of the present invention.

In yet another aspect, the present invention is a package for foodstuffs wherein the package absorbs moisture from the foodstuff, while retaining moisture within the packaging.

DETAILED DESCRIPTION OF THE INVENTION

All references disclosed here in the Detailed Description of the Invention are incorporated by reference, unless stated otherwise.

"Copolymer" means polymers containing two or more different monomers. The terms "dipolymer" and "terpolymer" mean polymers containing only two and three different monomers respectively. The phrase "copolymer of various monomers" means a copolymer whose units are derived from the various monomers.

In one embodiment, the present invention is a laminate film comprising an absorptive inner layer and an outer barrier layer. As the term is used herein, an inner layer can be any layer other than the outer barrier layer. For example, an inner layer can be innermost layer, that is, the layer that can come into direct contact with foodstuff placed inside a casing, or an absorptive inner layer can be any layer positioned between the innermost layer and the outer barrier layer. The outer barrier layer is the film layer furthest removed from the foodstuff.

Polymers suitable for use in an absorptive layer of the present invention are characterized by the fact that they are hydrophilic and hygroscopic. The absorptive inner layer comprises a polymer selected from polymers in the group consisting of: block copolyether ester polymers; and block copolyether amide polymers.

A copolyether ester (PEPE) suitable for use herein is a thermoplastic polymer. PEPE's suitable for use in the practice of the present invention have a viscosity that is in the range of from about 20 pascal seconds (Pa·s) to about 3000 Pa·s as determined according to standard method ISO11443. Preferably, the viscosity is in the range from about 20 to about 2000 Pa·s, more preferably from about 40 to about 1000 Pa·s, and most preferably from about 50 to about 700 Pa·s, measured according to the standard ISO11443.

Preferably, the melting point of the copolyether ester is greater than 120° C., more preferably in the range of from about 120° C. to above about 220° C. Melting points are determined by differential scanning calorimetry (DSC) in accordance with the standard ISO 3146.

Copolyether esters suitable for use herein are described in U.S. Pat. No. 4,725,481, the disclosure of which is incorporated herein by reference. Preferably, the copolyether esters have a multiplicity of repeating long-chain ester units and short-chain ester units that are randomly joined through head-to-tail ester linkages. The repeating long-chain ester units can be represented by the formula (I):

(I)

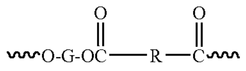

and said repeating short-chain ester units can be represented by the formula wherein:

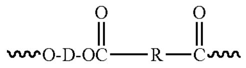

denotes the remaining unspecified portion of the copolyether ester polymer; "〰"

G is a divalent radical remaining after removal of terminal hydroxyl groups from a poly(alkylene oxide) glycol having a molecular weight in the range of from about 400 to about 3500, preferably from about 1000 to about 2500; short chain ester unit (II) is the reaction product obtained from an esterification reaction between a diol and a dicarboxylic acid;

D is a divalent radical remaining after removal of hydroxyl groups from a diol having a molecular weight of less than about 250; and R is a divalent radical remaining after removal of both carboxylic acid groups from a dicarboxylic acid having a molecular weight less than about 300;

with the proviso that an ester unit, if it is not a terminal ester unit, can be bonded at both ends to long chain ester units, or at both ends to short chain ester units, or at one end to a long chain ester unit and at the other end to a short chain ester unit, and with the further proviso that if the ester unit is a terminal unit, one of the unspecified portions in Formula I or Formula II is a substituent other than a long chain ester unit or a short chain ester unit. As used herein, the term "terminal" as it is used to refer to an ester unit has the meaning that is conventional in the polymer art, that is, referring to an ester unit located at the end of a polymeric chain.

PEPE's of the present invention have a moisture vapor transmission rate of at least about 1200, preferably from about 1200 to about 20000, g·25 micron/$m^2$·24 hrs as determined according to ASTM D6701-01.

Poly(alkylene oxide)glycols used to prepare copolyether-esters of the present invention preferably comprise poly(propylene ether) glycols and/or poly(ethylene ether) glycols. Most preferably, ethylene oxide groups are incorporated into the copolyether esters of the present invention. Long chain glycols (that is, glycols having a molecular weight of greater than 400) useful for preparing the copolyether esters of present invention preferably comprise sufficient ethylene oxide so that the copolyether ester incorporates from about 5 wt % to about 68 wt % ethylene oxide units, preferably from about 15 wt % to about 68 wt %, more preferably from about 20 wt % to about 55 wt % ethylene oxide units, based on the total weight of the copolyether ester. Reference to ethylene oxide groups incorporated in the copolyether ester(s) describes the weight percent in the total copolyether ester(s) of ($—CH_2—CH_2—O—$) groups in the long-chain ester units. The ethylene oxide groups in the copolyether ester that are counted to determine the amount of ethylene oxide groups in the polymer are those derived from the poly(alkylene oxide) glycol and not ethylene oxide groups introduced into the copolyether ester by means of a low molecular weight diol.

Suitable long-chain glycols include poly(ethylene oxide) glycol, ethylene-oxide capped poly(propylene oxide) glycol, mixtures of poly(ethylene oxide)glycol with other glycols such as ethylene oxide capped poly(propylene oxide)glycols and/or poly(tetramethylene oxide)glycol provided the resulting copolyether ester has an amount of ethylene oxide groups of at least about 5 weight percent. PEPEs prepared from poly(ethylene oxide)glycols having a molecular weight of from about 600 to 2500 are preferred. Particularly preferred are PEPEs prepared from an ethylene oxide capped poly (propylene oxide) having a molecular weight of about 2150.

Suitable low molecular weight diols useful for the purposes of the present invention include acyclic, alicyclic and aromatic diols. Preferred are diols having 2-15 carbon atoms such as ethylene glycol, propylene glycol, isobutylene glycol, butylene glycol, 1,4-pentamethylene glycol, 2,2-dimethyltrimethylene glycol, and decamethylene glycols, dihydroxycyclohexane, cyclohexane dimethanol, resorcinol, hydroquinone, 1,5-dihydroxynaphthalene, and similar diols. Especially preferred are aliphatic diols containing 2-8 carbon atoms, most especially 1,4-butanediol. Bisphenols that are useful include bis(p-hydroxy)diphenyl, bis(p-hydroxyphenyl)methane, and bis(p-hydroxyphenyl)propane. Equivalent ester-forming derivatives of diols can also be useful. For example, ethylene oxide or ethylene carbonate can be used in place of ethylene glycol in the practice of the present invention. The low molecular weight diols useful in the practice of the present invention to include equivalent ester-forming derivatives provided, however, that the molecular weight requirement pertains to the diol and not to its derivatives.

Dicarboxylic acids useful for making the copolyether esters of the present invention are aliphatic, cycloaliphatic or aromatic dicarboxylic acids, and functional equivalents thereof. These equivalents include esters and ester-forming derivatives, such as acid halides and anhydrides. The molecular weight requirement pertains to the acid form and not to its equivalent ester or ester-forming derivative.

The term "aliphatic dicarboxylic acids", as used herein, means carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used include sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid, decahydro-1,5-naphthylene dicarboxylic acid, 4,4,'-bicyclohexyl dicarboxylic acid, decahydro-2,6-naphthylene dicarboxylic acid, 4,4'-methylenebis(cyclohexyl)carboxylic acid and 3,4-furan dicarboxylic acid. Preferred acids are cyclohexane dicarboxylic acids and adipic acid.

Representative aromatic dicarboxylic acids include phthalic, terephthalic and isophthalic acids, bibenzoic acid, substituted dicarboxy compounds with two benzene nuclei such as bis(p-carboxyphenyl)methane, p-oxy-1,5-naphthalene dicarboxylic acid, 2,6-naphthalene dicarboxylic acid, 2,7-naphthalene dicarboxylic acid, 4,4,'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used providing an aromatic dicarboxylic acid is also present.

Aromatic dicarboxylic acids are a preferred class for preparing the copolyether ester polymers useful for this invention. Among the aromatic acids, those with 8-16 carbon atoms are preferred, particularly terephthalic acid alone or with a mixture of phthalic and/or isophthalic acids.

The copolyether esters contain about 25 wt % to about 80 wt % short-chain ester units corresponding to Formula (II) above, the remainder being long-chain ester units corresponding to Formula (I) above. When the copolyether esters contain less than about 25 wt % short-chain ester units, then the crystallization rate becomes very slow and the copolyether ester is tacky and difficult to handle. When more than about 80 wt % short-chain ester units are present, then the copolyether esters generally become too stiff. The copolyether esters preferably contain about 30 wt % to about 60 wt %, more preferably about 40 wt % to about 60 wt % short-chain ester units, the remainder being long-chain ester units. In general, as the percentage of short-chain ester units in the copolyether ester are increased, the polymer has a higher tensile strength and modulus, and the moisture vapor transmission rate decreases. Most preferably, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals does not exceed 30%. If a second dicarboxylic acid is used to make the copolyether ester, isophthalic acid is the acid of choice and if a second low molecular weight diol is used, 1,4-butenediol or hexamethylene glycol are the diols of choice.

It is understood that blends of different copolyether ester polymers are included in this invention.

Other minor components may be added as an option to optimize the reaction process or the performance of the copolyether esters obtained.

Block copolyether esters and their preparation are described in Encyclopedia of Polymer Science and Engineering, Volume 12, pages 76-177 (1985) and the references reported therein.

Suitable block copolyether esters for use in the present invention are products commercially available from a number of companies under various tradenames, for example Hytrel® available from E.I. du Pont de Nemours and Company, Riteflex® available from Ticona, and Arnitel® available from DSM.

The absorptive layer in the film of the invention may also comprise block copolyetheramides. Such block copolyetheramides typically consist of crystalline polyamide and noncrystalline polyether blocks. Typical polyamides may be nylon 6 or nylon 12, but the invention is not limited to copolyetheramides made with these polyamides. A commercially available series of polyetheramides are available under the tradename "Pebax®" from Atofina.

The Impermeable Outer Layer(s)

A second essential component of the film of the present invention is an impermeable outer layer. An impermeable layer of the present invention can be a single film layer, a laminate or multilayer film which comprises at least one layer of film comprising a polymer selected from polymers in the group consisting of: polyamides; ethylene vinyl alcohol copolymers; polyvinylidene chloride; and polyolefins. The impermeable outer layer can optionally comprise an adhesive layer which is useful as a tie layer between two non-compatible layers in a laminate outer layer. The adhesive layer (tie layer) can comprise anhydride-modified ethylene homopolymers and/or anhydride-modified ethylene copolymers.

The impermeable barrier structure can comprise several layers of polymers to provide effective barriers to moisture and oxygen and bulk mechanical properties suitable for processing and/or packaging the foodstuff, such as clarity, toughness and puncture-resistance. For smoking and/or cooking processes, shrink properties can be important. Examples of multilayer barrier structures suitable for use in this invention include, from outermost layer to innermost layer: polyethylene/tie layer/polyamide; polyethylene/tie layer/polyamide/tie layer/polyethylene; polypropylene/tie layer/polyamide/EVOH/polyamide; polyamide/tie layer/polyethylene; polyamide/tie layer/polyethylene/tie layer/polyamide; polyamide/tielayer/polyamide/EVOH/polyamide. Depending on the nature of the innermost layer of the impermeable structure, an additional inner tie layer can be interposed between the impermeable structure and the absorptive layer to provide a desirable level of adhesion to the absorptive layer.

Polyamides suitable for use herein include aliphatic polyamides, amorphous polyamides, or mixtures thereof. "Aliphatic polyamides" as the term is used herein can refer to aliphatic polyamides, aliphatic copolyamides, and blends or mixtures of these. Preferred aliphatic polyamides for use in the invention are polyamide 6, polyamide 6.66, blends and mixtures thereof. Polyamides 6.66 are commercially available under the tradenames "Ultramid C4" and "Ultramid C35" from BASF, or under the tradename "Ube5033FXD27" from Ube Industries Ltd. Polyamide 6 is commercially available under the tradename Nylon 4.12 from E.I. du Pont de Nemours, for example.

In a preferred embodiment of the invention, the aliphatic polyamide has a viscosity ranging from about 140 to about 270 cubic centimeters per gram ($cm^3/g$) measured according to ISO307 at 0.5% in 96% $H_2SO_4$.

The film may further comprise other polyamides such as those described in U.S. Pat. Nos. 5,408,000; 4,174,358; 3,393,210; 2,512,606; 2,312,966 and 2,241,322, which are incorporated herein by reference. The film may also comprise partially aromatic polyamides. A suitable partially aromatic polyamide is the amorphous copolyamide 6-I/6-T of the following formula:

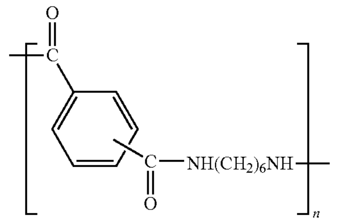

Some suitable partially aromatic copolyamides for use in the present invention are the amorphous nylon resins 6-I/6-T commercially available under the tradename Selar® PA from E.I. du Pont de Nemours and Company or commercially available under the tradename Grivory® G 21 from EMS-Chemie AG, for example.

Polyolefins suitable for use in the present invention are selected from polypropylenes, polyethylene polymers and copolymers. Polyethylenes useful for use herein can be prepared by a variety of methods, including well-known Ziegler-Natta catalyst polymerization (see for example U.S. Pat. No. 4,076,698 and U.S. Pat. No. 3,645,992), metallocene catalyst polymerization (see for example U.S. Pat. No. 5,198,401 and U.S. Pat. No. 5,405,922) and by free radical polymerization. Polyethylene polymers useful herein can include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE). The densities polyethylenes suitable for use in the present invention range from 0.865 g/cc to 0.970 g/cc. Linear polyethylenes for use herein can incorporate alpha-olefin comonomers such as butene, hexene or octene to decrease their density within the density range so described. The impermeable layer of the present invention can comprise ethylene copolymers such as ethylene vinyl esters, ethylene alkyl acrylates, ethylene acid dipolymers, ethylene acid terpolymers and their ionomers. Examples of such ethylene copolymers are ethylene vinyl acetate, ethylene methyl acrylate and ethylene (meth)acrylic acid polymers and their ionomers. Polypropylene polymers useful in the practice of the present invention include propylene homopolymers, impact modified polypropylene and copolymers of propylene and alpha-olefins and their blends.

Polyethylene/vinyl alcohol copolymers ("EVOH") having from about 20 to about 50 mole % ethylene can be suitable for use herein. Suitable polyethylene vinyl alcohol copolymers are commercially available under the tradename Evalca® from Kuraray or commercially available under the tradename Noltex® from Nippon Goshei, for example.

Polyvinylidene chloride (PVDC) suitable for use herein can be obtained commercially from Dow Chemical under the tradename Saran®, for example.

Anhydride or acid-modified ethylene and propylene homo- and co-polymers are used as extrudable adhesive layers (also known as "tie" layers) to improve bonding of layers of polymers together when the polymers do not adhere well to each other, thus improving the layer-to-layer adhesion in a multilayer structure. The compositions of the tie layers can be determined according to the compositions of the adjoining layers that need to be bonded in a multilayer structure. One skilled in the polymer art can select the appropriate tie layer based on the other materials used in the structure. Various tie layer compositions are commercially available under the tradename Bynel® from E.I. du Pont de Nemours and Company, for example.

Impermeable films of the present invention can additionally comprise optional materials, such as the conventional additives used in polymer films including: plasticizers, stabilizers, antioxidants, ultraviolet ray absorbers, hydrolytic stabilizers, anti-static agents, dyes or pigments, fillers, fire-retardants, lubricants, reinforcing agents such as glass fiber and flakes, processing aids, antiblock agents, release agents, and/or mixtures thereof.

Polymers described herein can be converted into a laminate film of the present invention by various techniques. For example, a laminate film can be obtained by coextrusion as follows: granulates of the various components can be melted in extruders; the molten polymers passed through a die or set of dies to form layers of molten polymers that are then processed as a laminar flow. The molten polymers can be cooled to form a layered structure. A coextruded polymer of the present invention can be laminated onto one or more other layers.

Other suitable converting techniques are, for example, blown film extrusion, cast film extrusion, cast sheet extrusion and extrusion coating. Preferably, the impermeable barrier film of the present invention is a blown film obtained by a blown film extrusion process.

A laminate film of the present invention can be further oriented beyond the immediate quenching or casting of the film. The process comprises the steps of coextruding a multilayer laminar flow of molten polymers, quenching the coextrudate and orienting the well quenched coextrudate in at least one direction. "Well-quenched" as the term is used herein describes an extrudate that has been substantially cooled below its melting point in order to obtain a solid film material.

The film may be uniaxially oriented, but is preferably biaxially oriented by drawing in two mutually perpendicular directions in the plane of the film to achieve a satisfactory combination of mechanical and physical properties.

Orientation and stretching apparatus to uniaxially or biaxially stretch film are known in the art and may be adapted by those skilled in the art to produce films of the present invention. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

In a preferred embodiment of the present invention, the laminate film of the present invention is oriented using a double bubble extrusion process, where simultaneous biaxial orientation may be effected by extruding a primary tube which is subsequently quenched, reheated and then expanded by internal gas pressure to induce transverse orientation, and drawn by differential speed nip or conveying rollers at a rate which will induce longitudinal orientation.

The processing to obtain an oriented blown film is known in the art as a double bubble technique, and can be carried out as described by Pahlke in U.S. Pat. No. 3,456,044. More particularly, a primary tube is melt extruded from an annular die. This extruded primary tube is cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through an annealing step (thermofixation), during which step it is heated once more to adjust the shrink properties. For preparation of food casings (for example, sausage casings, shrink bags) it may be desirable to maintain the film in a tubular form. For preparing flat films the tubular film can be slit along its length and opened up into flat sheets that can be rolled and/or further processed.

In another embodiment, the present invention is a process of manufacturing an oriented flat film comprising the steps of: 1) coextruding or coextrusion laminating an multilayer extrudate comprising an absorptive inner layer of the present invention and an impermeable outer layer of the present invention; and 2) processing the composition of step 1) through a flat die to form a well-quenched primary sheet and then orienting the sheet by means of a tenterframe stretcher, through traverse of a widening frame for transverse direction orientation and operation of differential speed nip or conveying rollers for machine direction orientation; both steps may occur either simultaneously or sequentially.

In still another aspect of the present invention is a process for manufacturing a tubular film comprising the steps of: (1) coextruding a multilayer extrudate comprising an absorptive inner layer of the present invention; (2) processing the extrudate of step (1) through an annular die to form a bubble film that is quenched by air or other means of internal bubble cooling and subsequently collapsed to make the tubular film.

In yet another aspect, the present invention is a process of manufacturing a cast flat film comprising the steps of: 1) coextruding or coextrusion laminating an multilayer extrudate comprising an absorptive inner layer of the present invention and an impermeable outer layer of the present invention; and 2) processing the composition of step 1) through a flat die onto a chilled metal roll to form a flexible laminate film.

The oriented flat film, the cast flat film or the tubular film slit to open it into a flat film may be further laminated to another film substrate by laminating methods known in the art, such as aqueous lamination, solvent lamination, solventless lamination, and the like.

In one embodiment, the absorptive inner layer with an optional tie layer, can be extrusion-coated onto a preformed barrier structure to form a film of this invention.

Preferably, the film of the invention can be processed on a film fabrication machine at a speed of from about 50 meters per minute (m/min) to a speed of about 200 m/min.

Films of the present invention can be useful for encasing and processing foodstuffs. Typically, the films are made into tubular casings, either by using blown film techniques to prepare a tubular form directly or by forming a flat sheet of the film into a tubular structure and fastening the edges of the sheet in a seam running the length of the tube. To facilitate the introduction of the foodstuff into the interior of the tubular casing, the casing optionally may be shirred prior to the introduction of the foodstuff. The term "shirred" means that the tubular casing is gathered into a multiplicity of rows parallel to the circumference of the tubing. The foodstuff is introduced into the interior of the optionally shirred tubular casing via the open end and the tube is stretched out to encase the foodstuff. One skilled in the art of packaging foodstuffs can readily introduce the foodstuff into the casing using well-established procedures.

The tubular casing can be further treated by the adsorption of at least one liquid food-processing flavorant and/or colorant into the absorbant layer of the casing. The flavorant and/or colorant is subsequently transferred to the foodstuff during such food processing as heating, curing, smoking, or cooking, for example.

In a preferred embodiment, a tubular casing of this invention comprises "liquid smoke" as a food-processing material which acts as both a flavorant and a colorant. Liquid smoke is well known to one skilled in the art of food processing and numerous variants are known and commercially available. Preferably a tubular casing comprising liquid smoke can be useful for processing sausage.

Foodstuffs that can be processed using film of this invention include beef, pork, poultry (for example, chicken and turkey), seafood (for example, fish and mollusks) and cheese. Meat products include, but are not limited to sausages, lunch meats, hams, turkey, hot dogs, kielbasa. Meat products can be whole-muscle, formulated into various meat slurries, formed into shapes, or ground. In the case of formed or ground meat, the meat can optionally be a mixture of material derived from more than one species. The foodstuff can be processed prior to its introduction into a casing of the present invention and then further processed in the casing.

In another embodiment, films of the present invention can also be made into bags, such as vacuum bags, shrinkbags, and pouches. Such bags can be formed form tubular film by sealing and then cutting the film transversely. Alternatively, the tubular film may be slit into flat film, and then sealed transversely at the top and bottom to produce bags. Alternatively, flat film whether produced by tubular or cast processes may be made into bags by folding the film and then sealing and cutting along two exposed lengths. Other methods of making bags and pouches are known and can be also used for the films of this invention.

In another embodiment, films of the present invention can be used for packaging foodstuffs where it is desirable to have absorption of moisture from the foodstuff, while retaining moisture within the packaging. Films of this invention can be used, for example, to package uncooked meat or cooked meats (e.g. beef, pork, poultry or seafood) wherein moisture from the foodstuff or excess marinades on the foodstuff can pass out of the foodstuff and pool below. Such films may be on the form of pouches, bags, casings or thermoformed films. It is also within the invention that the films of the invention may be laminated onto other substrates before being thermoformed.

The following table describes examples and comparative examples of the compositions of the absorptive layer. Examples are merely illustrative, and are not to be construed as limiting to the scope of the invention described and/or claimed herein.

film could be easily removed. In all cases, either HDPE (high density polyethylene) or nylon 6 were the other layers coextruded against the polymers of Table 1. In a number of cases, an antiblock concentrate sold by DuPont as Conpol® AC B was also added as described in the cases below. Blow up ratio was 2:1, and the stripped film layers had various thicknesses ranging from 25 to 64 microns.

In order to determine moisture pickup after 24 hours, the coextruded films were cut into 15.24 cm by 15.24 cm (6×6 inches) squares and then stripped. The absorptive film layer was then conditioned at 23° C. and 20% relative humidity for at least 24 hours before being weighed and then placed in a container of water. After 24 hours, the films were taken out, patted dry with paper towels so that no free moisture was visible on the film surfaces, and then immediately weighed. For each example in Table 2, the average taken of three samples is reported as the weight percent moisture absorption. The films conditioned at 23° C. and 20% relative humidity for at least 24 hours were also measured for moisture vapour transmission rate (MVTR) at 38° C. and 100% relative humidity. For samples with high water permeability, the transmission tests were conducted on a Mocon Permatran-

TABLE 1

| Example | Polymer Type | Melt Point ° C. | Description |
|---|---|---|---|
| 1 | Copolyether ester | 200 | 45 w % 1,4-butylene terephthalate, 55 w % ethylene oxide/propylene oxide copolyether terephthalate. Calculated ethylene oxide content of 33%. |
| 2 | Copolyether ester | 170 | 42 w % 1,4-butylene terephthalate, 12 w % 1,4-butylene isophthalate, 36 w % ethylene oxide/propylene oxide copolyether terephthalate, 10 w % ethylene oxide/propylene oxide copolyether isophterephthalate. Calculated ethylene oxide content of 13%. |
| 3 | Copolyether ester | 155 | 32 w % 1,4-butylene terephthalate, 9 w % 1,4-butylene isophthalate, 46 w % ethylene oxide/propylene oxide copolyether terephthalate, 13 w % ethylene oxide/propylene oxide copolyether isophterephthalate. Calculated ethylene oxide content of 17%. |
| 4 | Copolyester amide | 156 | Pebax ® MV 1074 |
| 5 | Copolyester amide | 195 | Pebax ® MH 1657 |
| Comp Ex 1 | Nylon 6 | 219 | Capron ® B135ZP |
| Comp Ex 2 | Nylon 6.66 | | Ultramid ® C135 |
| Comp Ex 3 | Copolyester | | Selar ® PT 8307 |
| Comp Ex 4 | Copolyether ester | 211 | 70 w % 1,4-butylene terephthalate, 30 w % poly(tetramethylene oxide) terephthalate. Calculated ethylene oxide content of 0%. |
| Comp Ex 5 | Copolyether ester | 203 | 60 w % 1,4-butylene terephthalate, 40 w % poly(tetramethylene oxide) terephthalate. Calculated ethylene oxide content of 0%. |

The polymers of Table 1 were coextruded with other non-adhering polymers on a three-layer blown film line in order to generate three-layer films in which the absorptive layer of the W® 101K, following ASTM D6701-01. For the other samples, the transmission tests were conducted on a Mocon Permatran-W® 700, following ASTM F1249-01.

TABLE 2

| Example | Polymer Type | Film Gauge microns | 24 Hour Water Gain w % | MVTR g-25 micron/$m^2$-day |
|---|---|---|---|---|
| 1 | Copolyether ester 1 | 30 | 23.9 | 14463 |
| 1 | Copolyether ester 1 | 53 | 24.0 | 16635 |
| 1 | Copolyether ester 1 | 64 | 24.1 | 14109 |
| 2 | Copolyether ester 2 | 48 | 2.1 | 2261 |
| 3 | Copolyether ester 3 | 41 | 5.9 | 5115 |
| 4 | Copolyester amide 1 | 43 | 29.8 | 10698 |
| 5 | Copolyester amide 2 | 43 | 60.6 | 13106 |
| Comp 1 | Nylon 6 | 20 | 7.6 | 651 |
| Comp 2 | Nylon 6.66 | 22 | 8.2 | 809 |
| Comp 3 | Copolyester | 25 | 1.1 | 169 |

TABLE 2-continued

| Example | Polymer Type | Film Gauge microns | 24 Hour Water Gain w % | MVTR g-25 micron/m$^2$-day |
|---|---|---|---|---|
| Comp 4 | Copolyether ester 4 | 46 | 0.7 | 762 |
| Comp 5 | Copolyether ester 5 | 46 | 0.1 | 822 |

Note:
Examples 1, 2 and 3 and Comparative Examples 4 and 5 also contained 2 weight % antiblock, Conpol ® AC B.

The examples in Table 2 have both high moisture absorption as well as high moisture transmission, whereas the comparative examples either show either poor moisture absorption and poor transmission or good moisture absorption but poor transmission.

Moisture pickup as a function of time up to 24 hours was also recorded. The films were subjected to the same treatment as described for Table 2. After each time of exposure in water, the films were taken out, patted dry with paper towels so that no free moisture was visible on the film surfaces, and then immediately weighed. These films were then discarded, and a different set of films used to measure the water pick up for a different exposure time. For each example and time in Table 3, the average measured for three samples is reported as the weight percent moisture absorption.

TABLE 3

| | | Water Absorption (wt % gain) at 23° C. over Time | | | | | | |
|---|---|---|---|---|---|---|---|---|
| Example | Gauge microns | 0 hr | 0.5 hr | 1 hr | 3 hr | 5 hr | 7 hr | 24 hr |
| 1[a] | 53 | 0 | 18.2 ± 6.0 | 23.6 ± 5.0 | 22.7 ± 0.5 | 21.1 ± 0.8 | 24.2 ± 0.4 | 24.0 ± 1.4 |
| 1[b] | 53 | 0 | 16.0 ± 15 | 23.2 ± 16 | 21.8 ± 0.8 | 19.9 ± 1.4 | 23.0 ± 1.2 | 23.8 ± 0.5 |
| 2[a] | 48 | 0 | 2.4 ± 0.2 | 2.6 ± 0.3 | 2.1 ± 0.3 | 2.4 ± 0.1 | 2.7 ± 0.2 | 2.07 ± 0.2 |
| 3[a] | 64 | 0 | 7.4 ± 4 | 3.8 ± 4.3 | 6.9 ± 1.0 | 4.2 ± 0.4 | 5.41 ± 1.6 | 5.9 ± 0.4 |
| Comp 5[a] | 43 | 0 | 0.6 ± 0.8 | 1.4 ± 1.6 | 0.4 ± 0.2 | 2.7 ± 3.4 | 0.2 ± 0.1 | 0.1 ± 0.1 |
| Comp 2 | 22 | 0 | 10.1 ± 0.1 | 8.6 ± 1.8 | 7.9 ± 0.7 | 8.6 ± 0.8 | 7.0 ± 0.8 | 8.2 ± 1.0 |

Notes:
[a]Examples 1, 2, 3 and Comparative Example 5 also contained 2 weight % antiblock, Conpol ® AC.
[b]Example 1 also contained 15 weight % antiblock, Conpol AC B.

TABLE 4

| | W % water pickup after soaking at 23° C. for 24 hours | % Weight Loss[a] with Time at 90° C. | | |
|---|---|---|---|---|
| | or greater | 5 mins | 10 mins | 60 mins |
| EX 1[b] | 29.4 ± 3.7 | −1.0 ± 1.2 | −0.8 ± 1.1 | −0.8 ± 1.2 |
| EX 3[b] | 5.4 ± 0.6 | −0.8 ± 0.2 | −0.9 ± 0.2 | −0.8 ± 0.2 |
| EX 4 | 45 ± 1 | −0.6 ± 0.4 | −0.8 ± 0.3 | −0.9 ± 0.3 |
| Ex 5 | 129 ± 9 | 8.9 ± 5.6 | −8.1 ± 0.6 | −8.3 ± 0.3 |
| Comp 5[b] | 0.8 ± 1.0 | −0.2 ± 0.2 | −0.05 ± 0.2 | −0.1 ± 0.2 |

[a]% weight loss from 'dry' weight of film, as decribed in the text.
[b]Examples contained 2 w % antiblock, Conpol ® AC B.

This table show that water pick up occurs quickly for both examples and comparative examples. Within 0.5 hours, the examples are close to or about the equilibrium level of water pickup at 23° C.

Moisture release from the films as a function of time and temperature was also recorded. In these experiments, the films were conditioned to 23° C. at 20% relative humidity for at least 24 hours, weighed to record its 'dry' weight, then placed in water at 23° C. for at least 24 hours (in some cases for 2 to 3 days) taken out, patted dry with paper towels so that no free moisture was visible on the film surfaces, and immediately weighed for its water-absorbed weight. Immediately after being weighed, the films were suspended in a radiant heat oven set at 90° C. No more than three films were placed in the oven at any one time, so that the individual films did not touch each other or the sides of the oven wall. The films were then taken out at 5, 10 and 60 minutes to be weighed. The averages of five to eight film samples are reported in Table 4 below.

The results in Table 4 show that the water-absorbed films very quickly release their water content at 90° C. within 5 minutes. Note that in many cases the weight of the films falls below the original 'dry' weight of the films. This is attributed to the fact that the original 'dry' weight was taken at 20% relative humidity, whereas the films were likely at a lower relative humidity with the heat treatment.

The next set of tests were conducted to determine the amount of liquid smoke taken up by the examples and comparative examples. The film samples were similar to those described in the earlier sets. The 6 by 6 inch stripped films were then placed in a 1 liter Nalgene™ high density polyethylene bottle filled with a liquid smoke, Charsol Supreme™ from Red Arrow Products or worcestershire sauce from Lea & Perrins and screw capped. Some films had been soaked between one to five days; however, it appeared that color changes owing to the absorption of the liquid medium was essentially complete by about 24 hours. The films in Table 5 were soaked for 48 hours, then were taken out on from the bottle, dried well with paper towels, and then placed against a white sheet of paper. Table 5 provides a description of the results.

TABLE 5

| | Absorbent | Film gauge microns | Description of post-absorbed film colour |
|---|---|---|---|
| Ex 1 | Liquid smoke | 53 | Very dark brown |
| Ex 1 | Liquid smoke | 32 | Dark brown |
| Ex 1 | Worcestershire sauce | 53 | Brown |
| Ex 4 | Liquid smoke | 43 | Very dark borwn |
| Comp 2 | Liquid smoke | 22 | Light brown with amber yellow to clear patches |
| Comp 3 | Liquid smoke | 30 | Transparent, no colour |
| Comp 4 | Liquid smoke | 46 | Light tan |

A clear, transparent multilayer tubular film was produced on a five layer double bubble line with the structure, from the outside of the tube to the inside, of Nylon 6 (28μ)/Bynel® 21 E787(3μ)/PE (5μ)/Bynel® 21 E787 (5μ)/Example 1 (14μ) with a total gauge of 55 microns (μ). A section of this film was also placed in a container of liquid smoke for 48 hours, removed and dried with paper towels. Upon removal, the multilayer film was brown.

Multilayer films containing the different examples were tested for liquid smoke transfer to meat at typical cooking and smoking conditions. In the first test, sheets of the examples and Comparative Example 6 casing materials, approximately 210 mm by 300 mm, were prepared. Comparative Example 6 is a commercially available smoking casing material comprising a multilayer polyethylene (15μ)/tie layer/polyamide (30μ)/tie layer/polyethylene(15μ) coextrudate laminated onto viscose-coated paper. The examples of the present invention were (co)extruded with different materials as described in Table 6, and were nominally between 25 to 50 microns.

To assess the liquid smoke absorption and transfer to foodstuff (e.g. meat), the casing materials were treated as follows:

liquid smoke was applied to the surface of the test film via an eyedropper and spread over the surface. After approximately 2 minutes, excess liquid smoke on the surface of the material was wiped off. For Comparative Example 6, smoke impregnation was conducted for approximately two days according to established procedures for this material.

The smoke-impregnated materials were laid over in a baking dish with the smoke-impregnated layer in contact with a ham product. The test units were treated in a typical "smoking" cycle at 180° F. for about two to three hours.

The smoke color of the ham product, as an indicator of smoke transfer from the casing material to the foodstuff, was rated on a scale from 1 to 5, with 1 indicating minimal smoke color and 5 indicating the most smoke color. The results are indicated in Table 6.

TABLE 6

| Casing Material | Smoke Color Rating |
|---|---|
| Example 2 on Polyethylene | 3 |
| Example 2 on Paper | 4; smoke liquid did not go into paper |
| Example 1 on Polyethylene | 5 |
| Comparative Example A | 5 |

In the next test multilayer blown film tubing of approximately 16.5 cm layflat width (or 10.5 cm in diameter) containing the examples as the inner absorbent layer were pre-absorbed with liquid smoke and allowed to dry. The tubing had a three layer structure of nylon 6 (50 microns)/Bynel® 21 E787 (18 microns)/absorptive layer (see Table 7). The tubing was hand stuffed with a ham formulation against the absorptive layer and then cooked under typical cooking conditions suitable for the specific meat product. A typical cooking cycle that was used was: 60° C. (dry bulb)/49° C. (wet bulb) for 30 minutes, followed by 68° C. (dry bulb)/57° C. (wet bulb) for 30 minutes, followed by 77° C. (dry bulb)/77° C. (wet bulb) for 2.5 hours. Table 7 describes the color of the meat product on removal of the casing following cooking.

TABLE 7

| | Absorptive layer gauge microns | Smoke transfer to product |
|---|---|---|
| Ex 1 | 38 | Excellent smoked colour |
| Ex 1 | 51 | Excellent smoked colour |
| Ex 2 | 51 | Good smoke colour |
| Ex 3 | 51 | Good smoke colour |

What is claimed is:

1. A method of processing a foodstuff comprising the steps:

(1) forming a treated film laminate by contacting a film laminate with at least one food-processing material, the film laminate comprising (i) a liquid absorptive layer useful for imparting flavor and color evenly to meat, and (ii) an impermeable barrier layer wherein:

(A) the liquid absorptive layer comprises a block copolyether ester polymer and (B) the impermeable barrier layer comprises a structure selected from the group consisting of single film layers, multilayer films and laminates, the barrier layer comprising: (a) at least one layer comprising a polymer, wherein the polymer is selected from the group consisting of: polyamides; mixtures of polyamides; ethylene vinyl alcohol copolymers; polyvinylidene chloride; polyolefins; and mixtures of any of these; and (b) optionally at least one tie layer;

and wherein the liquid absorptive layer has a moisture vapor transmission rate of from about 1200 to about 20,000 g 25 micron/$m^2$ 24 hrs;

(2) contacting the treated film laminate formed in step (1) with foodstuff; and (3) heating the foodstuff in the presence of the treated film laminate.

2. A method of claim 1 wherein the food-processing material is selected from the group consisting of flavorants and colorants.

3. A method of claim 1 wherein the food-processing material is liquid smoke.

4. A method of claim 1 wherein the foodstuff is sausage.

5. A method of claim 1 wherein the foodstuff is selected from the group consisting of beef, pork, poultry, seafood and cheese.

6. A method of claim 1 wherein the foodstuff is selected from the group consisting of lunch meats, hams, hot dogs and kielbasa.

7. A method of claim 1 wherein the foodstuff is uncooked meat.

8. A method of claim 1 wherein the foodstuff is cooked meat.

9. A method of claim 1 wherein the liquid absorptive layer comprises a copolyether ester comprising copolymerized units of an ethylene oxide/propylene oxide copolyether glycol having a molecular weight of about 2150.

10. A method of claim 1 wherein the treated film laminate is in the form of a tubular casing or bag.

11. A method of claim 10 wherein the treated film laminate is in the form of a tubular casing.

12. A method of claim 11 wherein the tubular casing is shirred prior to contact with foodstuff.

13. A method of claim 10 wherein the foodstuff is processed prior to introduction into the tubular casing or bag.

14. A method of claim 10 wherein the bag is selected from the group consisting of vacuum bags, shrinkbags, and pouches.

15. A method of claim 1 wherein the treated film laminate formed in step (1) is laminated to a shrinkable film layer prior to contact of the treated film laminate with foodstuff.

16. A method of claim 15 wherein the shrinkable film layer is a laminate.

17. A method of claim 1 wherein the film laminate that is treated with at least one food-processing material in step (1) is selected from the group consisting of oriented flat film laminates, cast flat film laminates and slit tubular film laminates.

18. A method of claim 17 wherein the treated film laminate of step (1) is further laminated to another film substrate prior to contact with foodstuff.

19. A method of claim 18 wherein the film substrate to which the treated film of step (1) is laminated is a shrinkable film.

* * * * *